Patented Oct. 10, 1939

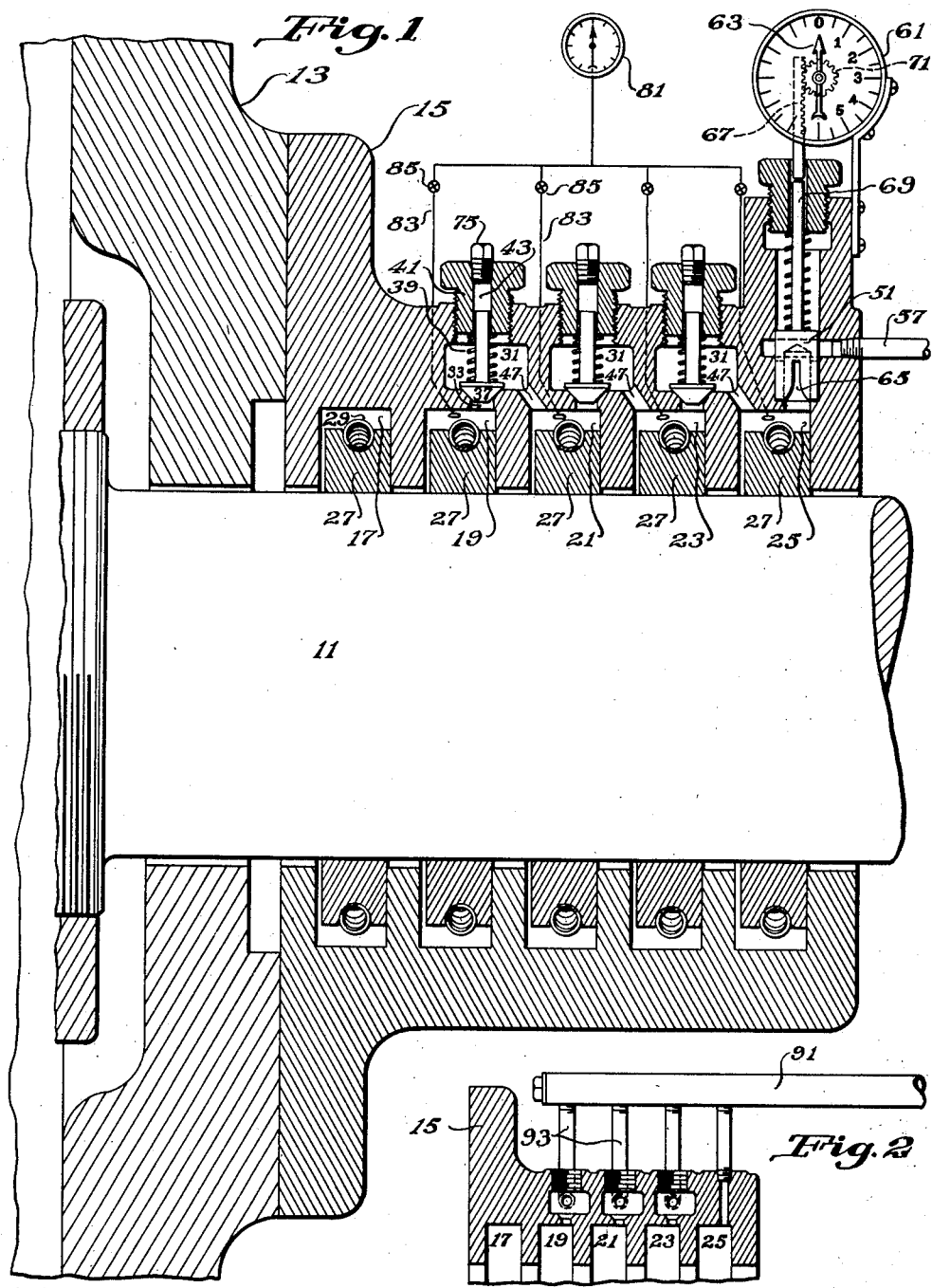

2,175,868

UNITED STATES PATENT OFFICE 2,175,868

PACKING

Oliver D. H. Bentley, Norfolk, Mass., assignor to B. F. Sturtevant Company, Hyde Park, Mass., a corporation of Massachusetts Application October 30, 1936, Serial No. 108,457

3 Claims. (Cl. 286—8)

The present invention relates to packing for rotating shafts and the like to prevent the passage of air, steam, or other fluid axially thereof.

Heretofore it has been a common practice in the construction of packing for rotating shafts, as, for example, in the case of steam turbines, to provide a plurality or series of packing members disposed axially along the shaft. This arrangement, while successfully used in turbines having a low exhaust pressure, is unsatisfactory where a high pressure is employed, being subjected under such conditions to rapid wear with resulting leakage and the necessity of frequent replacements. Inasmuch as the turbine must be stopped in operation and a portion of the casing removed in order to replace the worn and defective packing, such repair involved not only substantial expense, but often a very objectionable interference with the operation of the plant in such portions as were dependent upon the turbine.

It has been found that where such a packing is exposed to high pressure, the wear and deterioration is excessive, being proportionately many times greater than at low pressure, actual tests indicating that the rate of wear varies approximately as the cube of the pressure. It is believed that the rapid wear of the packing under such conditions is because each packing member of the series is subjected in turn to the entire high pressure. Thus, the first member carries the full exhaust pressure until wear and leakage develop, when the pressure is transferred to the second member. This member holds the pressure temporarily, but soon wear occurs and leakage results and the third member receives the pressure. So in a relatively short period of time the entire series becomes worn and leaky due to the fact that each bears successively the full pressure.

It is the object of the present invention to avoid rapid wear on a packing member subjected to a high pressure by applying a controlled counter-pressure to the member so that the effective pressure upon the member shall be substantially reduced.

A further object of the present invention is to provide a packing for high pressures wherein each of a series of packing members is subjected to only a fractional part of the total pressure.

Other objects are to provide simple and effective apparatus for continuously indicating the effectiveness of the series of packing members as a whole while in regular operation, and also for determining and adjusting the amount of pressure carried by each of the members.

With these objects in view, a feature of the present invention is the application of a controlled, reduced, counter pressure to the packing member or members. Another feature is the application of controlled counter pressures in progressively reduced amounts to successive packing members of a series. Another feature is the provision of adjustable, automatically-operating relief valves for controlling the direct and counter pressures on the packing members. Still another feature is an indicating device with connections and controls for indicating the direct and counter pressures upon the several packing members.

A further feature is an indicating apparatus for showing the rate of escape or passage of the steam or other fluid through or past the last of the series of packing members to indicate the effectiveness of the packing and thus warn the operator when repairs or replacements are required.

In the accompanying drawing which illustrates what is now considered a preferred form of the present invention as applied to a steam turbine operating with high exhaust pressure, Fig. 1 is a vertical section of a portion of a casing and shaft of such a turbine provided with the improved packing, and Fig. 2 is a horizontal section on a reduced scale of a portion of the casing showing a modification of the same.

Fig. 1 illustrates a rotating turbine shaft 11 extending through the wall of the casing 13. Secured to the turbine casing and surrounding the projecting portion of the shaft is the packing unit which comprises the casing 15 provided on its inner periphery with a plurality or series of annular packing chambers. The chamber 17 nearest the turbine casing for convenience will be termed the primary chamber, and the other chambers 19, 21, 23 and 25 will be termed the secondary chambers. In each chamber, both primary and secondary, is the packing member or ring 27 of the common and well-known type consisting of arc-shaped sections of carbon or other suitable packing material held in close contact with the shaft by means of the encircling coil spring 29.

As formerly constructed, this constituted the entire packing unit, and it is obvious that the share borne by each ring in resisting the pressure of the steam in the turbine casing was wholly indeterminate and might be from substantially nothing to the full steam pressure, depending upon the condition of the other rings interposed between it and the casing. According to the present invention, however, each ring is compelled to carry its proportionate share of the pressure, and this is accomplished by maintaining a controlled, progressively reduced pressure in the series of the secondary chambers from the high to the low pressure end of the unit.

To accomplish this, each of the secondary chambers is provided with an exhaust passage controlled by a reducing or relief valve set or adjusted to relieve the pressure in each secondary chamber when it reaches a predetermined maximum, and less by the desired amount than the pressure in the next adjacent chamber on the high pressure side.

In the form shown in Fig. 1, each of the annular secondary chambers is provided with a valve chamber 31 to which it is connected by the port 33 controlled by the relief valve 37. The valve is pressed downwardly by the coil spring 39 which engages the screw plug 41 closing the upper end of the valve chamber, and having a central bore 43 to guide the upper end of the valve stem 45. By screwing the plug or head 41 further into or out of the casing, the valve 37 will open to relieve its secondary chamber at any desired pressure, thereby to maintain the predetermined pressure in such secondary chamber in opposition to the high pressure in the next chamber.

Preferably the several relief valves in the series will be so adjusted that there will be a regular or uniform reduction in the pressures progressively through the series of secondary chambers in order that each packing member or ring will bear substantially the same effective pressure.

Thus, assuming the exhaust pressure in the turbine casing to be 160 pounds, that will be the pressure in the first or primary chamber. The relief valve of the first secondary chamber 19 will be adjusted to maintain a maximum pressure of 120 pounds, so that the effective pressure of the steam seeking to escape past the packing ring in the primary chamber will be 40 pounds.

The relief valve of the second secondary chamber in turn will be adjusted to maintain a maximum pressure of 80 pounds, so that the effective pressure of the packing ring in the first secondary chamber will be the difference between the 120 pounds in that chamber and the second secondary chamber, which is 40 pounds. Similarly, the relief valve of the third secondary chamber will be adjusted to maintain a pressure of 40 pounds, giving an effective pressure on the packing ring of the second secondary chamber of the same 40 pounds.

The fourth or last secondary chamber 25, may, if desired, exhaust directly to the atmosphere, but preferably provision will be made to maintain a slight pressure in that chamber, say of five pounds, which would give an effective pressure on the packing member or ring of the third secondary chamber of thirty-five pounds, only slightly less than in the preceding chambers.

While the slight leakage which invariably takes place through the several packing rings may be relied upon to build up the back pressures in the secondary chambers, the excess steam or fluid being conducted away from the unit, preferably the excess steam or fluid passing the relief valves is carried to the next adjacent secondary chamber on the low side. With such an arrangement the counter pressures in all the chambers are quickly brought up to the desired amounts and with a minimum of leakage and that at only one place, viz. at the first or primary packing member.

In Fig. 1 which shows this preferred construction, each of the valve chambers 31 are connected by the always open passages 47 to the next lower secondary chamber. Thus any excess of steam or fluid passing from the first secondary chamber 19 through relief valve 37 to valve chamber 21, building up the counter pressure until it reaches the desired amount when the excess will pass the relief valve into the valve chamber and thence into the third secondary chamber, and so on through the series.

In order to have a continuous indication so that the operator in charge of the turbine may see at a glance if the packing is functioning properly, an indicating device has been provided in the form of a dial 61 and pointer 63, which will show directly and continuously the rate of flow of steam through the packing unit as measured at its discharge from the last secondary chamber. By constructing the relief valve as shown in the form of a cylinder or sleeve with the lateral port 65, which is substantially parallel sided from the upper or initial part of its length and then expanding or flaring for the lower or final part of its length, the extent of lifting of the valve may be made directly proportional to the rate of flow through the valve. A rack bar 67, engaging at its lower end the top of the valve spindle 69 and with the rack at its upper end actuating the pinion 71 on the pointer shaft, the pointer will be given an angular movement directly proportional to the rate of flow through the valve.

If the reading or position of the head of the pointer on the dial or scale remains substantially constant, the operator will know that the packing unit is functioning in a proper manner. Any increase in such reading will indicate some disturbance or interference with the proper functioning of the unit and that attention is required either in the way of readjustment of the pressures in the secondary chambers, or replacement of worn or damaged packing rings.

In order to enable the operator to determine the proper adjustment of the several relief valves to give the desired pressures in their respective chambers, adjusting plugs or heads 41 for each valve have been provided with a plug 75 screwed into the end of the central bore of the head. By removing the plug the operator may insert a pressure gage and read directly the pressure maintained in the valve chamber, which will correspond to that in the next adjacent packing chamber.

Preferably, however, provision will be made for ascertaining the pressure by merely opening a valve, thus facilitating not only the initial adjustment of the valves, but also their readjustment, if such becomes necessary. Such indicating means are shown in Fig. 1 as a pressure gage 81 connected through branch pipes 83 with each of the secondary chambers. The valves 85 in each of the branch pipes are normally closed, but any one may be quickly opened to determine the pressure in its corresponding chamber. Thus the pressure in each chamber can be tested successively and proper adjustments made of the heads 41 to secure the predetermined pressures, it being only necessary to open one valve after another while the remaining valves are kept closed.

In Fig. 2 a somewhat simpler construction is shown than in Fig. 1. In the modification of Fig. 2 the leakage of steam past a packing ring is relied upon to build up the pressure in the next adjacent secondary chamber, the predetermined pressure being secured by means of relief valves which permit the discharge or exhaust of the excess steam from the chamber to some suitable conductor. In Fig. 2 is shown an exhaust pipe 91 connected by branch pipes 93 with the valve chambers of the first three secondary packing chambers, and directly to the fourth or last packing chamber. Thus, when, due to leakage from the primary chamber 17, the pressure in the first secondary chamber 19 exceeds the proper pressure of, say, 120 pounds, the relief valve will be lifted and the steam discharged through the valve chamber and branch pipe 92 into the exhaust pipe 91. Similarly, the relief valves of the secondary chambers 21 and 23 will be opened to relieve the pressure in their respective chambers. Any steam which reaches the last secondary chamber will pass directly to the exhaust pipe 91. Preferably a slight pressure of, say, 10 pounds will be maintained in this pipe so that a slight pressure will be maintained in the last secondary chamber in opposition to the pressure in the preceding chamber.

In the operation of the packing unit embodying the present invention as shown in Fig. 1, any steam leaking past the first packing ring in primary chamber 17 passes directly in the first secondary chamber 19 where it collects until it has built up the desired back pressure. Thereafter any excess will pass relief valve 37 and through valve chamber 31 and passage into the second secondary chamber 21. Here again the steam will collect until the desired back pressure is attained whereupon the excess passes to chamber 23 and so on until all of the secondary chambers carry the proper pressure so that each packing member or ring bears only its own proportionate share of the total high pressure in the casing.

After this condition has been established, any further leakage through the unit will escape past valve 51 into the exhaust pipe 57, recording the rate of flow on the gage 61. In order to determine whether each packing is carrying its proper share of the total pressure and neither too much nor too little, the operator will test the pressure in each chamber by opening momentarily the valve 85 in the connection from such chamber to the gage 81, making the necessary adjustment of the valve spring 39 to secure the desired pressure.

Similarly, with the modification shown in Fig. 2, the momentary opening of the valve to render the gage operative will indicate the adjustment required of the tension of the relief valve spring.

While the present invention has been shown and described in a specific form, it is to be understood that it is not limited thereto, but the form and arrangement of the various parts may be varied within the scope of the appended claims.

Having thus described the invention, what is claimed is:

1. A packing for movable shafts and the like, comprising a casing extending axially of and surrounding the shaft and provided with a plurality of annular chambers spaced axially in the casing and open to the shaft, a packing ring in each chamber engaging the periphery of the shaft, independent connections between adjacent chambers for conducting fluid from one chamber to another, and relief valves for limiting the pressures in the chambers to determine graduated diminishing pressures in the successive chambers.

2. A packing for movable shafts and the like, comprising a casing extending axially of and surrounding the shaft and provided with a series of annular chambers spaced axially in the casing and open to the shaft, a packing ring in each chamber engaging the periphery of the shaft, valve chambers connected with the annular chambers, independent connections between the valve chambers and the next adjacent annular chamber on the low pressure side, adjustable valves in the valve chambers for regulating the flow through said chambers and connections to determine graduated diminishing pressures in the series of chambers.

3. A packing for movable shafts and the like, comprising a casing extending axially of and surrounding the shaft and provided with a series of annular chambers spaced axially in the casing and open to the shaft, a packing ring in each chamber engaging the periphery of the shaft, the ring being smaller than its chamber to provide a clearance space therein, independent connections between the clearance spaces of adjacent chambers for conducting fluid from one to the other, and means in said connections for limiting the pressures of the conducted fluid to determine graduated diminishing pressures in successive chambers.

OLIVER D. H. BENTLEY.